United States Patent
Charbonneau et al.

(10) Patent No.: US 10,351,463 B2
(45) Date of Patent: Jul. 16, 2019

(54) FIBROUS PRODUCT AND METHOD AND APPARATUS FOR MAKING THE PRODUCT

(75) Inventors: Mark William Charbonneau, Lakewood, CO (US); Alessandro G Borsa, Evergreen, CO (US)

(73) Assignee: Johns Manville, Denver, CO (US)

(*) Notice: Subject to any disclaimer, the term of this patent is extended or adjusted under 35 U.S.C. 154(b) by 984 days.

(21) Appl. No.: 13/069,668

(22) Filed: Mar. 23, 2011

(65) Prior Publication Data
US 2011/0167875 A1 Jul. 14, 2011

Related U.S. Application Data

(62) Division of application No. 11/728,643, filed on Mar. 27, 2007, now abandoned.

(51) Int. Cl.
C03B 37/04 (2006.01)
D04H 1/4226 (2012.01)

(52) U.S. Cl.
CPC .......... *C03B 37/048* (2013.01); *C03B 37/045* (2013.01); *D04H 1/4226* (2013.01); *Y10T 156/1771* (2015.01); *Y10T 442/2008* (2015.04)

(58) Field of Classification Search
CPC . C04B 38/0058; C04B 35/00; C04B 38/0054; C04B 2235/3418; C04B 2235/36; C04B 2235/5427; C04B 2235/5436; C04B 2235/5445; C04B 2235/656; C04B 2235/72; C04B 2235/77; C04B 35/111; C04B 35/505; C03B 37/048; C03B 37/045; D04H 1/4226; Y10T 442/2008; Y10T 156/1771
USPC .............................................. 28/103; 65/470
See application file for complete search history.

(56) References Cited

U.S. PATENT DOCUMENTS

| | | | | |
|---|---|---|---|---|
| 4,992,327 A | * | 2/1991 | Donovan | A41G 11/02 428/198 |
| 5,437,922 A | * | 8/1995 | Jackson et al. | 442/341 |
| 5,795,639 A | * | 8/1998 | Lin | 428/68 |
| 2008/0026659 A1 | * | 1/2008 | Brandner et al. | 442/327 |

* cited by examiner

*Primary Examiner* — Elizabeth M Cole
*Assistant Examiner* — Elizabeth M Imani
(74) *Attorney, Agent, or Firm* — Robert D. Touslee

(57) ABSTRACT

A nonwoven fibrous insulation product has at least a bi-modal fiber diameter distribution designed to provide the product with selected thermal insulating and physical performance properties that are affected by fiber diameter such as rigidity and recovery properties. The product is made by: forming two or more fiber groupings that each have a selected fiber diameter distribution with a selected mean fiber diameter wherein the selected fiber diameter distributions of the fiber groupings differ from each other. The fibers of the fiber groupings are intermingled and entangled together in selected percentages by weight to form a product with a selected density and thickness that exhibits selected product performance properties based on the properties of the fiber groupings and the relative percentages by weight of the fiber groupings.

7 Claims, 4 Drawing Sheets

FIBROUS PRODUCT AND METHOD AND APPARATUS FOR MAKING THE PRODUCT

This application is a division of application Ser. No. 11/728,643, filed Mar. 27, 2007. The subject invention relates to a nonwoven fibrous insulation product that has at least a bi-modal fiber diameter distribution designed to provide the fibrous product with selected thermal insulating and one or more selected physical properties that are affected by fiber diameter, such as rigidity and recovery properties, and to the method and an apparatus for making such a fibrous product. While the nonwoven fibrous product of the subject invention can have other applications and the method and apparatus of the subject invention can be used to make nonwoven fibrous products for other applications, the nonwoven fibrous product of the subject invention is particularly well suited for making nonwoven fibrous insulation products such as building insulation batts and rolls commonly used to insulate the wall, floor, ceiling, and/or roofing structures of residential, commercial, and industrial buildings. It is contemplated that the use of the method and apparatus of the subject invention for making fibrous products, such as fibrous insulation products with at least bi-modal fiber distributions, can result in manufacturing process cost savings and fibrous insulation products that, compared to fibrous insulation products with uni-modal fiber diameter distributions, exhibit an enhanced combination of thermal insulating and physical rigidity and recovery properties specifically designed to meet the requirements of different insulating applications.

BACKGROUND OF THE INVENTION

While nonwoven glass fiber air filtration products have been made with bi-modal fiber diameter distributions as disclosed in U.S. Pat. No. 5,454,848, issued Oct. 3, 1995, entitled "METHOD OF MAKING AIR FILTRATION MEDIA BY INTER-MIXING COARSE AND FINE GLASS FIBERS" and U.S. Pat. No. 6,227,009 B1, issued May 8, 2001, and entitled "METHOD OF MAKING LONG, FINE DIAMETER GLASS FIBERS AND PRODUCTS MADE WITH SUCH GLASS FIBERS", the subject invention relates to a nonwoven fibrous insulation product with at least a bi-modal fiber diameter distribution that can provide the fibrous insulation product with a unique and enhanced combination of thermal and other desirable properties.

SUMMARY OF THE INVENTION

The nonwoven fibrous insulation product of the subject invention has at least a bi-modal fiber diameter distribution designed to provide the fibrous insulation product with selected thermal insulating and one or more selected physical properties that are affected by fiber diameter, such as rigidity and recovery properties, and is designed to meet the requirements of particular insulating applications. The nonwoven fibrous insulation product of the subject invention is well suited for applications, such as but not limited to wall, floor, ceiling, and roofing structure-insulating applications for residential, commercial, and industrial building construction. The nonwoven fibrous insulation product of the subject invention includes at least a bi-modal fiber diameter distribution formed by at least first and second fiber groupings having selected fiber diameter distributions within selected fiber diameter ranges. When the fiber diameter distributions of the fiber groupings are plotted graphically, the fiber diameter distributions of the fiber groupings typically form generally bell shaped curves over their selected diameter ranges. Each fiber grouping has a selected fiber diameter distribution with a selected mean fiber diameter that differs from the selected fiber diameter distribution and selected mean fiber diameter of the other fiber groupings in the nonwoven fibrous insulation product. In the nonwoven fibrous insulation product of the subject invention, the fibers of the different fiber groupings are intermingled and entangled, preferably uniformly or substantially uniformly intermingled and entangled together, to form the nonwoven fibrous insulation product with an enhanced combination of thermal insulating and physical properties affected by fiber diameter, such as rigidity and recovery properties, specifically designed to meet the requirements of different insulating applications. The nonwoven fibrous insulation product of the subject invention has selected percentages by weight of the fibers of the different fiber groupings and the properties of the different fiber groupings together with the percentages by weight of the different fiber groupings in the nonwoven fibrous insulation product are selected to cause a nonwoven fibrous insulation product of a selected density and thickness to exhibit a selected product thermal insulating performance property and one or more additional selected physical product performance properties, such as rigidity and recovery properties, designed to suit the requirements of a particular insulating application.

In a preferred embodiment of the subject invention, the fibers of the first fiber grouping are included in the nonwoven fibrous insulation product primarily for the thermal insulating performance and rigidity provided the nonwoven fibrous insulation product by the fibers of the first fiber grouping; the selected mean fiber diameter of the second fiber grouping is larger than the selected mean fiber diameter of the first fiber grouping; and the fibers of the second fiber grouping are included in the nonwoven fibrous insulation product primarily for the recovery from an application of compressive forces provided the nonwoven fibrous insulation product by the fibers of the second fiber grouping.

The method of the subject invention for making a nonwoven fibrous insulation product having at least a bi-modal fiber diameter distribution is designed to provide the nonwoven fibrous insulation product with selected thermal insulating performance and physical performance properties, such as rigidity and recovery properties, that are affected by fiber diameter. For a nonwoven fibrous insulation product with a bi-modal fiber diameter distribution, the method of the subject invention includes determining the properties of first and second fiber groupings and, for a nonwoven fibrous insulation product of a selected density and thickness, a percentage by weight of the fibers of the nonwoven fibrous insulation product to be formed by the fibers of the first fiber grouping and a percentage by weight of the fibers of the nonwoven fibrous insulation product to be formed by the fibers of the second fiber grouping that will provide the nonwoven fibrous insulation product with a selected product thermal insulating performance property and one or more selected physical product performance properties affected by fiber diameter. The fibers of the first fiber grouping have a selected fiber diameter distribution with a selected mean fiber diameter. The fibers of the second fiber grouping have a selected fiber diameter distribution with a selected mean fiber diameter. The selected fiber diameter distribution of the second fiber grouping differs from the selected fiber diameter distribution of the first fiber grouping. A nonwoven fibrous insulation product is made that has the determined percentages by weight of the fibers of the first and second fiber groupings intermingled and entangled together whereby the nonwoven fibrous insulation product produced at a selected density and thickness exhibits a selected product thermal insulating performance property and the one or more selected physical product performance properties. Where required to further enhance product properties, the fibers of one or both of the fiber groupings may be made up of more than one type of fiber e.g. glass fibers and metallic, polymeric, and/or basaltic fibers.

While other apparatuses can be used to produce the nonwoven fibrous insulation product of the subject invention, a preferred apparatus for producing the nonwoven fibrous insulation product of the subject invention is a unique rotary glass fiberization apparatus. This unique rotary fiberization apparatus utilizes a fiberizing spinner that has glass fiberization holes sized and in selected relative numbers to form at least a first fiber grouping and a second fiber grouping in selected relative percentages by weight when glass is extruded through the glass fiberization holes. The fibers of the different fiber groupings have different selected fiber diameter distributions with different selected mean fiber diameters. When the fibers of the fiber groupings are intermingled and entangled, a nonwoven fibrous insulation product of a selected density and thickness is formed having at least a bi-modal fiber diameter distribution designed to provide the nonwoven fibrous insulation product with selected thermal and physical performance properties resulting from the fiber diameter distributions of the intermingled and entangled fibers of the fiber groupings, the relative percentages by weight of the fiber groupings, the product density, and the product thickness.

DETAILED DESCRIPTION OF THE INVENTION

Figure 1:
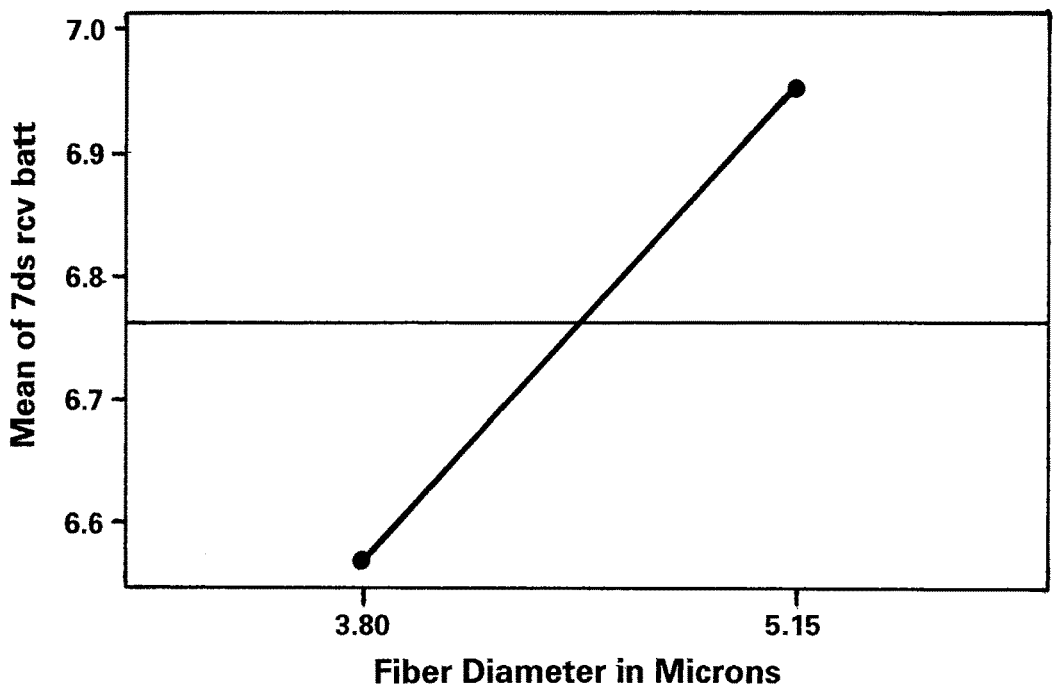
FIG. 1 is a graph showing the affect of fiber diameter on the recovery of a nonwoven fibrous insulation product in thickness from compressive forces (product recovery after 7 days where higher recovery numbers indicate greater recovery).
Figure 2:
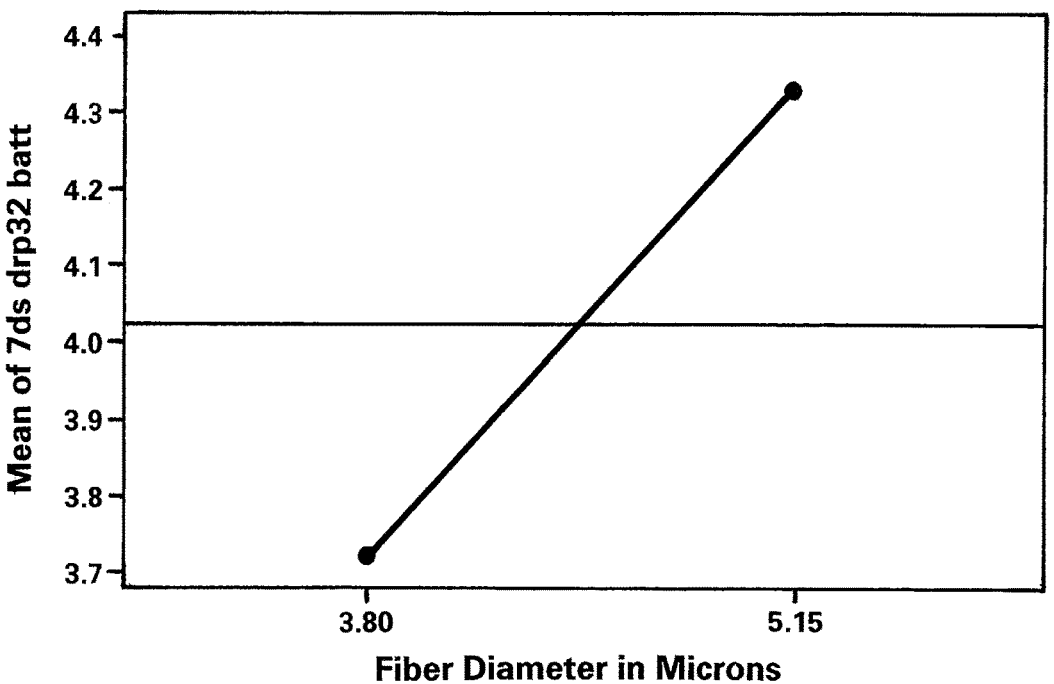
FIG. 2 is a graph showing the affect of fiber diameter on the rigidity of a nonwoven fibrous insulation product (product droop after 7 days where lower droop numbers indicate greater rigidity).
Figure 3:
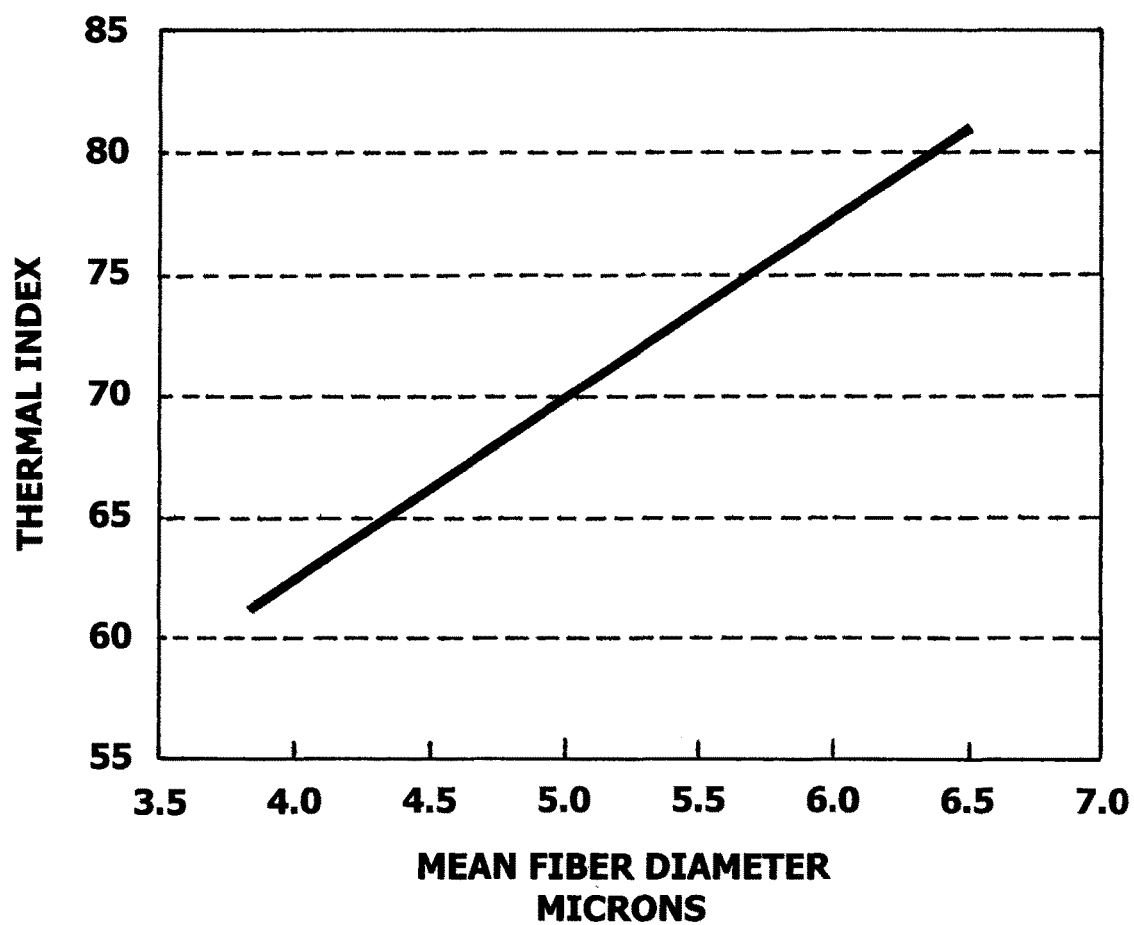
FIG. 3 is a graph showing the affect of fiber diameter on the thermal performance of a nonwoven fibrous insulation product (where lower thermal index numbers indicate greater insulating performance).

The graphical representations of FIGS. 1, 2 and 3 illustrate the affect of glass fiber diameter on the properties exhibited by a nonwoven fibrous product such as a nonwoven fibrous insulation product. As illustrated in FIG. 1, for a selected product density, as an average fiber diameter of a nonwoven fibrous product increases, the rigidity of the nonwoven fibrous product decreases. As illustrated in FIG. 2, for a selected product density, as an average fiber diameter of a nonwoven fibrous product increases, the ability of a compressed fibrous insulation product to recover in thickness relative to an initial uncompressed thickness increases. As illustrated in FIG. 3, for a selected product density, as the average fiber diameter of a fibrous insulation product increases the thermal insulating properties of the fibrous insulation product decrease (the thermal conductivity of the product increases or the R-value of the product decreases).

As used herein, the physical property "rigidity" refers to the stiffness of a nonwoven fibrous product (e.g. a nonwoven glass fiber insulation batt or roll) and the degree to which the nonwoven fibrous product droops when being handled. In general, the more rigid or less droopy a nonwoven fibrous insulation product, the easier it is for an installer to handle the product in the field. As used herein, the physical property "recovery" refers to the ability of a nonwoven fibrous product, such as a nonwoven fibrous insulation product, to recover in thickness after being subjected to compressive forces that reduce the nonwoven fibrous product in thickness, such as the compressive forces that fibrous insulation products are normally subjected to when packaged. In general, the greater the ability of a fibrous insulation product of a selected average fiber diameter and density to recover from a compressed thickness to an initial uncompressed thickness, the better the thermal insulating performance exhibited by the insulation product (the lower the thermal conductivity or the higher the R-value of the product). When making a nonwoven fibrous insulation product not only the thermal performance of the product, but the rigidity of the product and the ability of the product to recover from compression should also be considered when designing the product and the subject invention permits a product to be designed that exhibits the thermal and physical properties best suited for a particular application.

Figure 4:
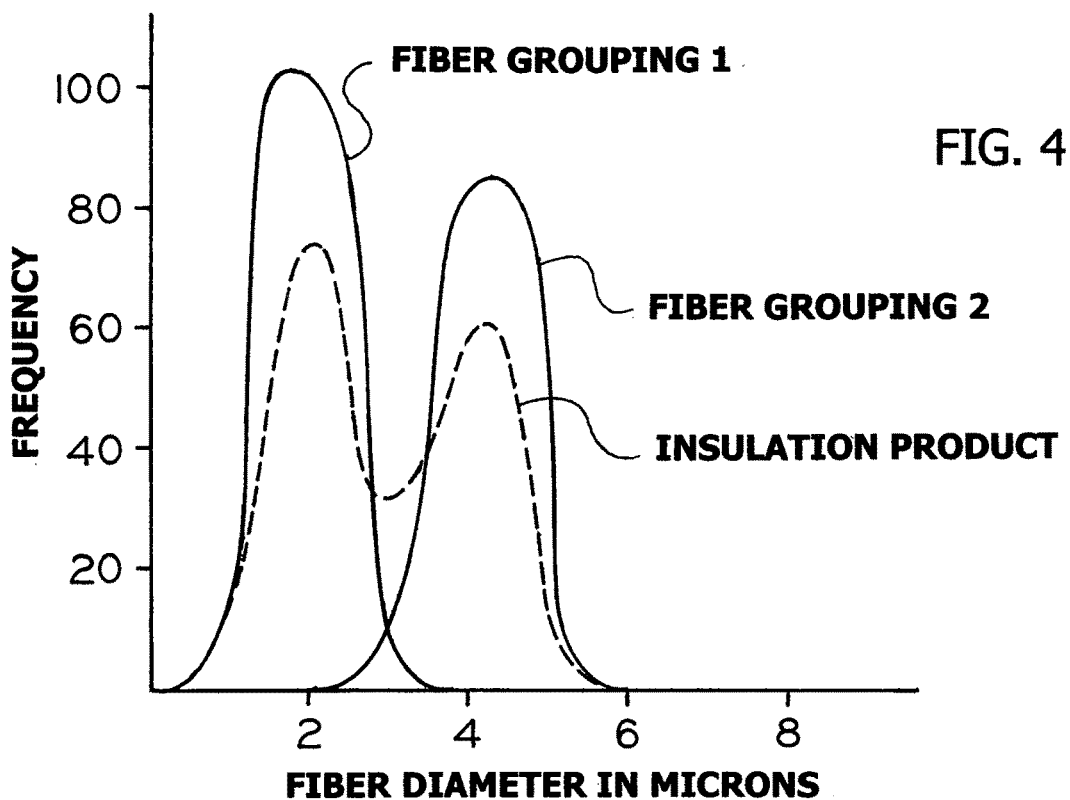
FIG. 4 has a solid line schematic graphical representation of an example of a bi-modal fiber diameter distribution of a fibrous product of the subject invention wherein, when frequency of fiber diameter verses fiber diameter for the different fiber diameter distributions of the two fiber grouping are plotted, the fiber diameter distributions form the two generally bell shaped curves of FIG. 4. The dashed line schematic graphical representation of FIG. 4 shows an example of a fiber diameter distribution of the fibrous product formed by combining the two fiber groupings.
Figure 5:
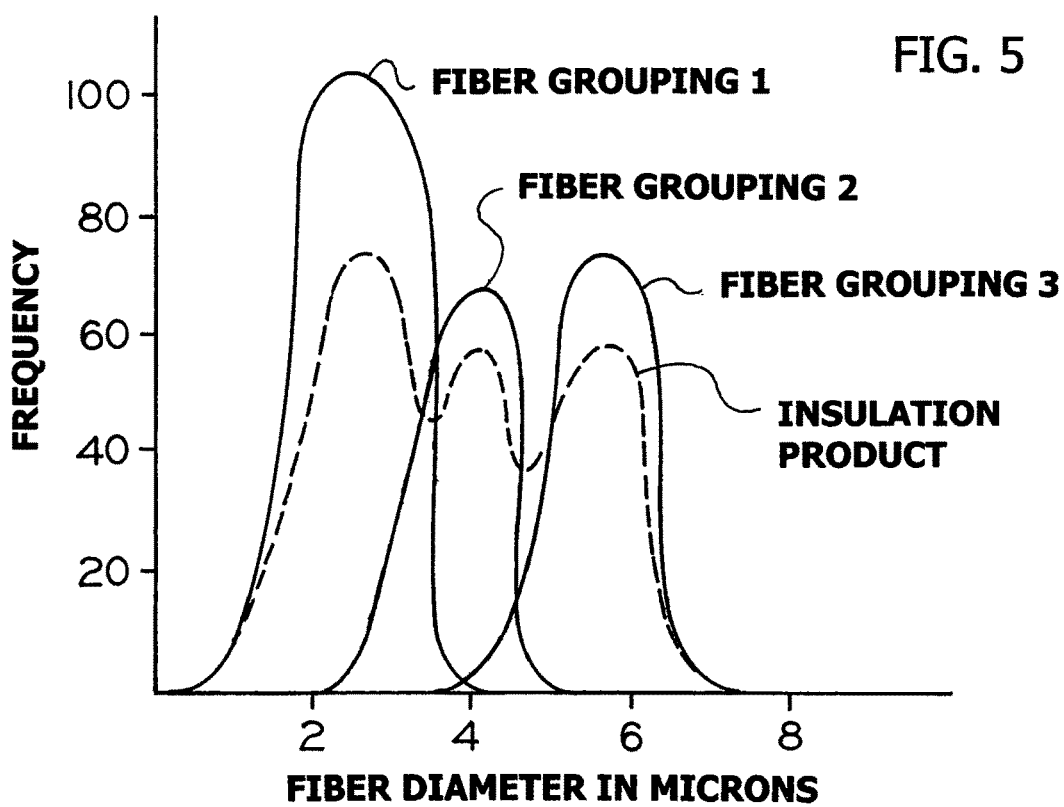
FIG. 5 has a solid line schematic graphical representation of an example of a tri-modal fiber diameter distribution of a fibrous product of the subject invention wherein, when frequency of fiber diameter verses fiber diameter for the different fiber diameter distributions of the three fiber groupings is plotted, the fiber diameter distributions form the three generally bell shaped curves of FIG. 5. The dashed line schematic graphical representation of FIG. 5 shows an example of a fiber diameter distribution of the fibrous product formed by combining the three fiber groupings.

The nonwoven fibrous insulation product of the subject invention includes two or more different fiber groupings. As graphically represented by the solid lines in FIG. 4, a nonwoven fibrous insulation product of the subject invention having a bi-modal fiber diameter distribution includes: a first fiber grouping of fibers having a selected fiber diameter distribution with a selected mean fiber diameter and a generally bell shaped curve; and a second fiber grouping of fibers having a selected fiber diameter distribution with a selected mean fiber diameter and a generally bell shaped curve wherein the selected fiber diameter distribution of the second fiber grouping differs from the selected fiber distribution of the first fiber grouping. As graphically represented by solid lines in FIG. 5, a tri-modal nonwoven fibrous insulation product of the subject invention has a third fiber grouping of fibers having a selected fiber diameter distribution with a selected mean fiber diameter and a generally bell shaped curve wherein the selected fiber diameter distribution of the third fiber grouping differs from the selected fiber diameter distributions of the first and second fiber groupings. To form a nonwoven fibrous product of the subject invention, such as a nonwoven fibrous insulation product, with a desired thermal property and desired properties of rigidity and recovery, the selected fiber diameter distributions of the two or more fiber groupings forming the nonwoven fibrous product differ from each other with the selected mean fiber diameter for each of the two or more fiber groupings differing from each other. The dashed lines of FIGS. 4 and 5 represent examples of insulation products that could be formed by combining the fiber groupings of those figures. In addition to the fiber diameter distributions of the different fiber groupings, the relative percentages by weight of the different fiber groupings in the insulation products affects the fiber diameter distributions of the insulation products.

For example, a nonwoven fibrous product of the subject invention, such as a nonwoven fibrous insulation product having at least a bi-modal fiber diameter distribution designed to provide the fibrous insulation product with selected thermal insulating performance and physical performance properties that are affected by fiber diameter, includes: a first fiber grouping of fibers having a selected fiber diameter distribution with a selected mean fiber diameter; and a second fiber grouping of fibers having a selected fiber diameter distribution with a selected mean fiber diameter wherein the selected fiber diameter distribution of the second fiber grouping differs from the selected fiber diameter distribution of the first fiber grouping.

A typical nonwoven fibrous insulation product of the subject invention is building insulation batt or roll commonly used to insulate the wall, floor, ceiling, and/or roofing structures of residential, commercial, and industrial buildings. The building insulation batts are typically about three inches in thickness or greater, about fifteen inches in width or greater, and about forty-six inches in length or greater. Building insulation rolls are typically about three inches in thickness or greater, about fifteen inches in width or greater, and about forty feet in length or greater. A typical nonwoven fibrous insulation product of the subject invention is made of glass fiber groupings produced by a rotary and/or flame attenuation process or of glass fiber groupings produced by a rotary and/or flame attenuation process and one or more fiber groupings of metallic, polymeric, and/or basaltic fibers.

The nonwoven fibrous insulation product of the subject invention has a first selected percentage by weight of the fibers of the first fiber grouping; a second selected percentage by weight of the fibers of the second fiber grouping; and, where one or more additional fiber groupings are utilized, additional selected percentages by weight of these additional fiber groupings that are selected to cause the nonwoven fibrous insulation product of the subject invention to exhibit a selected product thermal insulating performance property and one or more selected product physical performance properties. The fibers of the different fiber groupings of the nonwoven fibrous insulation product are intermingled and entangled together and preferably, uniformly dispersed or substantially uniformly dispersed throughout the nonwoven fibrous insulation product. While other selected performance properties of the nonwoven fibrous insulation product of the subject invention may be taken into consideration in addition to the thermal insulating performance property of the nonwoven fibrous insulation product for a selected product density, the rigidity and recovery of the nonwoven fibrous insulation product for a selected product density and thickness are typically the primary performance properties considered in selecting the two or more fiber groupings that provide the nonwoven fibrous insulation product with a plurality of desired thermal and physical performance properties designed to best meet the performance requirements of a particular application.

In a preferred embodiment of the nonwoven fibrous insulation product of the subject invention, the fibrous insulation product includes a first fiber grouping that has a first selected fiber diameter distribution with a first selected mean fiber diameter that when plotted forms a first selected generally bell shaped curve and a second fiber grouping that has a second selected fiber diameter distribution with a second mean fiber diameter that when plotted forms a second selected generally bell shaped curve. The second selected mean fiber diameter of the second fiber grouping is larger than the first selected mean fiber diameter of the first fiber grouping. The fibers of the first fiber grouping are included in the nonwoven fibrous insulation product primarily for the thermal insulating performance and rigidity provided the nonwoven fibrous insulation product by the fibers of the first fiber grouping and the fibers of the second fiber grouping are included in the nonwoven fibrous insulation product primarily for the recovery from an application of compressive forces provided the nonwoven fibrous insulation product by the fibers of the second fiber grouping.

The method of the subject invention for making a nonwoven fibrous insulation product having at least a bi-modal fiber diameter distribution is designed to provide the nonwoven fibrous insulation product with selected thermal insulating performance and physical performance properties, such as selected rigidity and recovery properties. For a nonwoven fibrous insulation product having a bi-modal fiber distribution, the method of the subject invention includes: selecting the thermal and physical properties desired for a nonwoven fibrous insulation product at a selected density and thickness; determining a thermal insulating performance property and one or more physical performance properties provided at the selected product density and thickness for the nonwoven fibrous insulation product by a first fiber grouping having a selected fiber diameter distribution; and determining a thermal insulating performance property and one or more physical performance properties provided at the selected product density and thickness for the nonwoven fibrous insulation product by a second fiber grouping having a selected fiber diameter distribution that differs from the selected fiber diameter distribution of the first fiber grouping. The method of the subject invention further includes determining a percentage by weight of fibers of the nonwoven fibrous insulation product of the first fiber grouping and a percentage by weight of the fibers of the nonwoven fibrous insulation product of the second fiber grouping required to form the nonwoven fibrous insulation product with a selected product thermal insulating performance property and one or more selected product physical performance properties at the selected product density and thickness. A nonwoven fibrous insulation product of the selected product density and thickness is then made of intermingled, entangled, and preferably uniformly or substantially uniformly dispersed fibers of the first and second fiber groupings wherein the product has the determined percentages by weight of the fibers of the first and second fiber groupings and the fibrous insulation product produced exhibits the selected product thermal insulating performance property and the one or more selected product physical performance properties.

For a nonwoven fibrous insulation product having a tri-modal fiber distribution, the method of the subject invention includes: determining the thermal and physical properties desired for a nonwoven fibrous insulation product at a selected product density and thickness; determining a thermal insulating performance property and one or more physical performance properties provided at the selected product density and thickness for the nonwoven fibrous insulation product by a first fiber grouping having a selected fiber diameter distribution; determining a thermal insulating performance property and one or more physical performance properties provided at the selected product density and thickness for the nonwoven fibrous insulation product by a second fiber grouping having a selected fiber diameter distribution that differs from the selected fiber diameter distribution of the first fiber grouping; and determining a thermal insulating performance property and one or more physical performance properties provided at the selected product density and thickness for the nonwoven fibrous insulation product by a third fiber grouping having a selected fiber diameter distribution that differs from the selected fiber diameter distributions of the first and second fiber groupings. The method of the subject invention further includes determining a percentage by weight of fibers of the nonwoven fibrous insulation product of the first fiber grouping, a percentage by weight of the fibers of the nonwoven fibrous insulation product of the second fiber grouping, and a percentage by weight of the fibers of the nonwoven fibrous insulation product of the third fiber grouping required to form the nonwoven fibrous insulation product with the selected product thermal insulating performance property and one or more selected product physical performance properties at the selected product density and thickness. A nonwoven fibrous insulation product of the selected density and thickness is then made of intermingled, entangled, and preferably uniformly or substantially uniformly fibers of the first, second, and third fiber groupings that has the determined percentages by weight of the fibers of the first, second, and third fiber groupings whereby the fibrous insulation product produced exhibits the selected product thermal insulating performance property and the one or more selected product physical performance properties.

Figure 6:
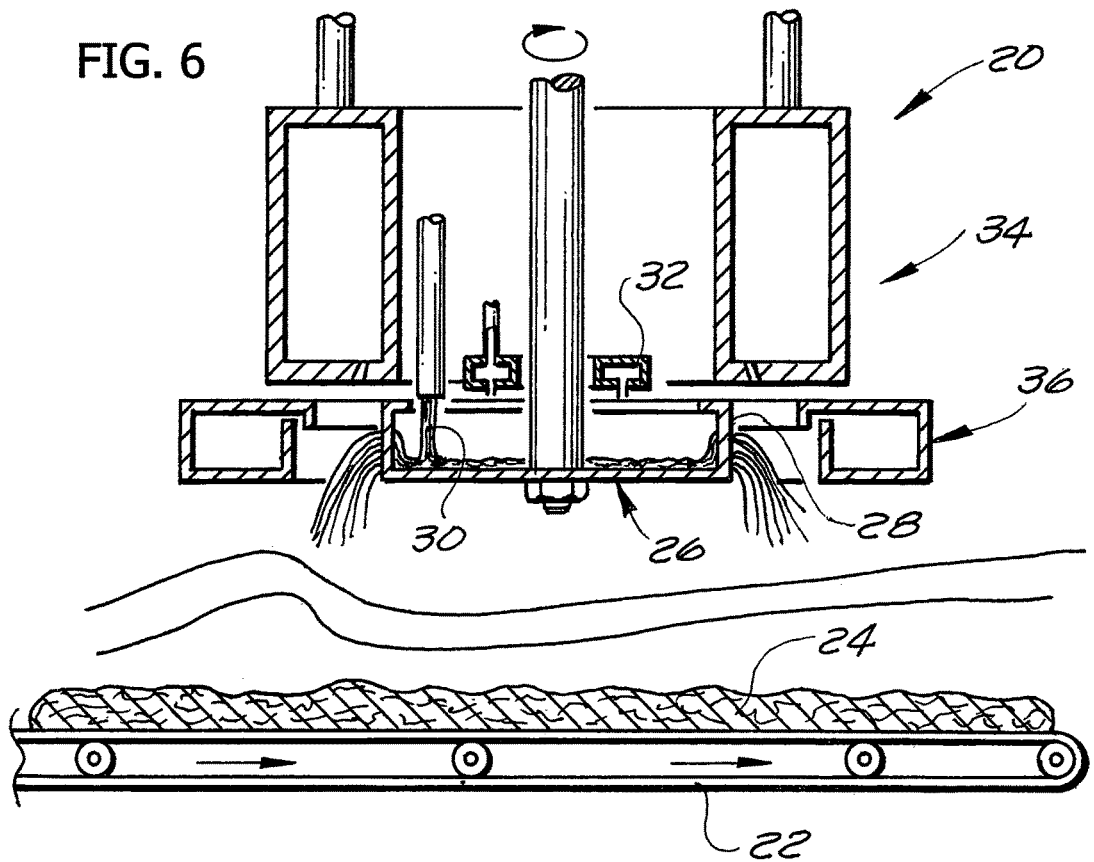
FIG. 6 is a schematic vertical section, with portions broken away, of an example of a production station that utilizes a rotary fiberization apparatus for making a nonwoven fibrous insulation product of the subject invention.

While other apparatuses can be used to produce the nonwoven fibrous insulation product of the subject invention, a preferred apparatus for producing the nonwoven fibrous insulation product of the subject invention is a rotary glass fiberization apparatus comprising one or more rotary fiberizing units. The rotary fiberizing unit 20 shown in FIG. 6 is an example of one type of rotary fiberizing unit that can be used in the method of the subject invention to make a nonwoven fibrous insulation product of the subject invention having at least a bi-modal fiber distribution. The one or more fiberizing units 20 are located in a collection chamber (not shown) and produce glass fibers that are drawn down onto and collected on a moving foraminous collection conveyor 22 to form a nonwoven fibrous insulation product 24 (a mat or blanket) of intermingled and entangled fibers. In the example shown, each fiberization unit 20 has a rotating fiberizing spinner 26 with an annular peripheral sidewall 28 having thousands of fiberizing holes therein that are typically between about 0.16 and about 0.033 inches in diameter; a stream of molten glass 30 is introduced into the interior of the fiberizing spinner 26; preferably, an internal burner 32 is used to adjust and/or maintain the temperature of the molten glass 30 within the fiberizing spinner 26 and thereby control the viscosity of the molten glass 30 and facilitate the fiberization of the molten glass as the molten glass is passed by centrifugal force through the fiberizing holes in the fiberizing spinner sidewall 28; an annular attenuation burner 34 directs an annular curtain of combustion gases downward along and adjacent an external surface of an annular fiberizing spinner sidewall 28 attenuates the fibers produced by the fiberizing spinner 26; and an annular air ring 36 directs an annular curtain of air downward externally of the fiberizing spinner sidewall 28 to direct the fibers produced by the fiberization unit down onto the collection conveyor 22. The sidewall 28 of the fiberizing spinner 26 used in the rotary fiberization unit 20 has fiberization holes sized to form two or more fiber groupings of the type described above in connection with the nonwoven fibrous insulation product of the subject invention when glass is extruded by centrifugal force through the fiberization holes of the spinner sidewall 28. The number of fiberization holes sized to form each fiber grouping is selected so that the nonwoven fibrous insulation product being produced has a selected percentage by weight of each of the fiber groupings. When the fibers of the fiber groupings formed by the fiberizing unit 20 are intermingled and entangled to form the mat or blanket on the collection conveyor, the nonwoven fibrous insulation product 24 formed has at least a bi-modal fiber diameter distribution designed to provide the nonwoven fibrous insulation product with selected performance properties.

It is contemplated that there are various fiberization hole configurations that could be utilized in the fiberizing spinner sidewall 28 to produce two or more different fiber groupings of the type described above in connection with the nonwoven fibrous insulation product and method of the subject invention wherein the fiber groupings exhibit selected properties and are produced in relative percentages by weight to provide a nonwoven fibrous insulation product produced from the fiber groupings with selected thermal and physical properties. While it is contemplated that numerous fiberization hole configurations could be used, FIGS. 7 and 8 are examples of potential fiberization hole configurations that could be used in the fiberizing spinner sidewall 28 to form at least two different fiber groupings having different fiber diameter distributions and in selected percentages by weight to thereby form a nonwoven fibrous insulation product in accordance with the method of the subject invention.

Figure 7:
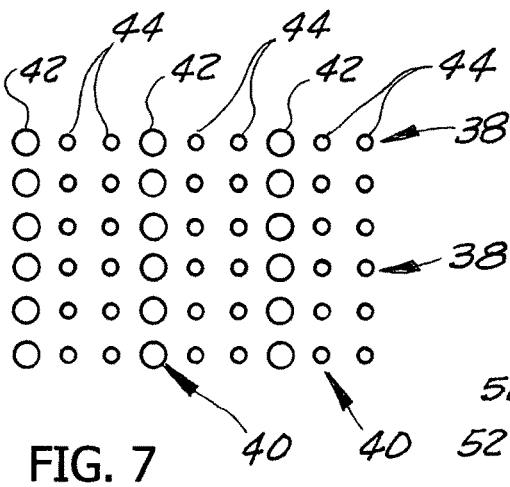
FIGS. 7 and 8 are schematic elevations of portions of different fiberizing spinner sidewalls, on a greatly enlarged scale, showing examples of different fiberizing hole-patterns that could be used on the fiberizing spinner of FIG. 5 to form a fibrous product with at least a bi-modal fiber diameter distribution.

FIG. 7 schematically illustrates a first potential fiberization hole configuration for producing two different fiber groupings of the type described above in connection with the nonwoven fibrous insulation product and method of the subject invention and in relative percentages by weight of a product being produced to provide a nonwoven fibrous insulation product with selected thermal and physical properties. In the fiberization hole configuration shown in FIG. 7 there are a series of annular rows 38 and vertical columns 40 of fiberization holes in the annular sidewall 28 of the fiberizing spinner 26. Each annular row 38 includes a first set of fiberization holes 42 of a first diameter for producing a first fiber grouping and a second set of fiberization holes 44 of a second diameter for producing a second fiber grouping in selected relative percentages by weight.

Figure 8:
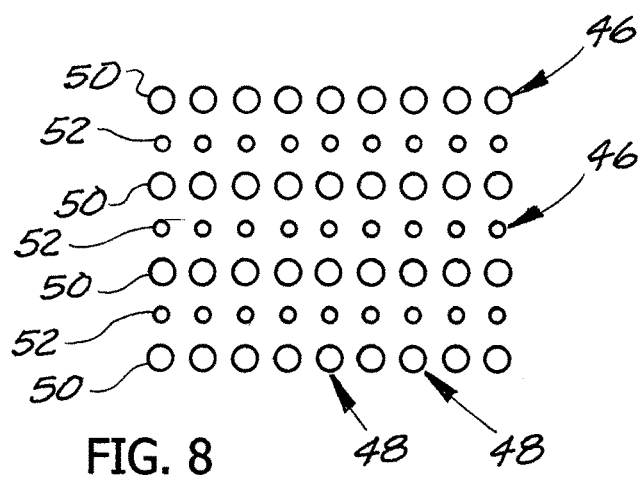

FIG. 8 schematically illustrates a second potential fiberization hole configuration for producing two fiber groupings of the type described above in connection with the nonwoven fibrous insulation product and method of the subject invention and in relative percentages by weight of a product being produced to provide a nonwoven fibrous insulation product with selected thermal and physical properties. In the fiberization hole configuration shown in FIG. 8 there are a series of annular rows 46 and vertical columns 48 of fiberization holes in the annular sidewall 28 of the fiberizing spinner 26. Each vertical column 48 includes a first set of fiberization holes 50 of a first diameter for producing a first fiber grouping and a second set of fiberization holes 52 of a second diameter for producing a second fiber grouping in selected relative percentages by weight.

It is also contemplated that where there are a series of rotary fiberizing units 20 forming the nonwoven fibrous insulation product within the collection chamber, individual rotary fiberizing units 20 of the series of fiberizing units could be used to form different fiber groupings, e.g. $1^{st}$ rotary fiberizing unit 20 forms a first fiber grouping, $2^{nd}$ rotary fiberizing unit forms a second fiber grouping, $3^{rd}$ rotary fiberizing unit forms a third fiber grouping. It is also contemplated that apparatuses of the type disclosed in U.S. Pat. No. 5,123,949, issued Jun. 23, 1992, and entitled, "METHOD OF INTRODUCING ADDITIVES TO FIBROUS PRODUCTS", could be used to introduce fiber groupings into the nonwoven fibrous insulation product of the subject invention e.g. in addition to one or more groupings of glass fibers produced by a rotary or flame attenuation process, one or more fiber groupings of metallic, polymeric, and/or basaltic fibers could be introduced into the product by the apparatuses of U.S. Pat. No. 5,123,949, the disclosure of which is hereby incorporated herein in its entirety by reference.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of making a nonwoven fibrous insulation product having at least a bi-modal fiber diameter distribution comprising:
   providing a first fiber grouping having a selected fiber diameter distribution primarily for selected thermal insulating performance and rigidity that forms a generally bell shaped curve at a fiber diameter of about 2 microns;
   providing a second fiber grouping having a selected fiber diameter distribution that is primarily for recovery from an application of compressive forces that forms a generally bell shaped curve at a fiber diameter of about 4 microns; and
   intermingling and entangling fibers of the first and second fiber groupings in an amount of about 55% by weight of the first fiber grouping and about 45% by weight of the second fiber grouping to form a nonwoven fibrous insulation product.

2. The method of making a nonwoven fibrous insulation product according to claim 1, wherein:
   the fibers of the first and second fiber groupings of the nonwoven fibrous insulation product comprise glass fibers.

3. The method of making a nonwoven fibrous insulation product according to claim 2, wherein:
   the fibers of the nonwoven fibrous insulation product comprise glass fibers and non-glass fibers.

4. The method of making a nonwoven fibrous insulation product according to claim 1, wherein:
   the fibers of the first and second fiber groupings are made by a rotary fiberization process.

5. The method of making a nonwoven fibrous insulation product according to claim 4, wherein:
   the rotary glass fiberization process utilizes a fiberizing spinner having at least two sets of fiberizing holes wherein a first set of fiberizing holes is designed to form the fibers of the nonwoven fibrous insulation product of the first fiber grouping and a second set of fiberizing holes is designed to form the fibers of the nonwoven fibrous insulation product of the second fiber grouping in the percentages by weight used in the nonwoven fibrous insulation product.

6. The method of making a nonwoven fibrous insulation product according to claim 4, wherein:
   the rotary glass fiberization process utilizes at least a first and a second fiberizing station with a fiberizing spinner of the first fiberizing station forming the fibers of the nonwoven fibrous insulation product of the first fiber grouping and a fiberizing spinner of the second fiberizing station forming the fibers of the nonwoven fibrous insulation product of the second fiber grouping in the percentages by weight used in the nonwoven fibrous insulation product.

7. A method of making a nonwoven fibrous insulation product having at least a tri-modal fiber diameter distribution comprising:
   providing a first fiber grouping having a selected fiber diameter distribution primarily for a selected thermal insulating property that forms a generally bell shaped curve at a fiber diameter of about 2 microns;
   providing a second fiber grouping having a selected fiber diameter distribution primarily for a selected rigidity insulating property that forms a generally bell shaped curve at a fiber diameter of about 4 microns;
   providing a third fiber grouping having a selected fiber diameter distribution primarily for a selected recovery insulating property that forms a generally bell shaped curve at a fiber diameter of about 6 microns; and
   intermingling and entangling fibers of the first, second, and third fiber groupings in an amount of about 40% by weight of the first fiber grouping, about 30% by weight of the second fiber grouping and about 30% by weight of the third fiber grouping to form a nonwoven fibrous insulation product.

* * * * *